United States Patent
Schillings

(10) Patent No.: US 10,169,919 B2
(45) Date of Patent: Jan. 1, 2019

(54) HEADSET VISUAL DISPLACEMENT FOR MOTION CORRECTION

(71) Applicant: Oath Inc., New York, NY (US)

(72) Inventor: Benoit Schillings, Los Altos Hills, CA (US)

(73) Assignee: Oath Inc., New York, NY (US)

(*) Notice: Subject to any disclaimer, the term of this patent is extended or adjusted under 35 U.S.C. 154(b) by 120 days.

(21) Appl. No.: 15/260,383

(22) Filed: Sep. 9, 2016

(65) Prior Publication Data

US 2018/0075653 A1    Mar. 15, 2018

(51) Int. Cl.
| | | |
|---|---|---|
| G09G 5/00 | (2006.01) | |
| G06T 19/00 | (2011.01) | |
| G06F 3/041 | (2006.01) | |
| G06T 7/00 | (2017.01) | |
| G06F 3/01 | (2006.01) | |

(52) U.S. Cl.
CPC ............ *G06T 19/006* (2013.01); *G06F 3/012* (2013.01); *G06F 3/041* (2013.01); *G06T 7/004* (2013.01)

(58) Field of Classification Search
None
See application file for complete search history.

(56) References Cited

U.S. PATENT DOCUMENTS

| | | | | |
|---|---|---|---|---|
| 5,742,264 A * | 4/1998 | Inagaki | ................ | G02B 27/017 345/7 |
| 2008/0123167 A1* | 5/2008 | Weiss | ....................... | H04N 3/08 359/198.1 |
| 2008/0137087 A1* | 6/2008 | Greten | ................. | G01N 21/359 356/445 |
| 2008/0218436 A1* | 9/2008 | Lipscomb | ............ | G02B 27/017 345/8 |
| 2014/0375540 A1* | 12/2014 | Ackerman | .............. | G06F 3/013 345/156 |
| 2015/0215581 A1* | 7/2015 | Barzuza | ................ | G06T 19/006 348/14.1 |
| 2015/0355461 A1* | 12/2015 | Kessler | .............. | G02B 27/0103 359/631 |
| 2016/0011417 A1* | 1/2016 | Border | .............. | G02B 27/0172 359/630 |
| 2016/0049008 A1* | 2/2016 | Haddick | ............ | G02B 27/0172 345/633 |
| 2016/0366392 A1* | 12/2016 | Raghoebardajal | ... | H04N 19/132 |

(Continued)

*Primary Examiner* — David H Chu
(74) *Attorney, Agent, or Firm* — Cooper Legal Group, LLC

(57) ABSTRACT

Many headset devices, such as virtual reality helmets, present visuals that respond to the user's motion, such that a rotation of the user's head causes the visual to be re-rendered from a correspondingly rotated perspective. The lag between the user's motion and the updated rendering from the new perspective may be perceivable even at high framerates, and may induce unpleasant feelings such as vertigo. Instead, headset devices may respond to detected motion by identifying a displacement of the physical location of the visual that causes it to maintain a physical position relative to a stationary reference point. The display is operatively coupled with a displacer, such as actuators or a projection adjustment, that are engaged to displace the display according to the identified displacement and maintain a physical location of the visual relative to the stationary reference point (e.g., until the visual is re-rendered from the updated perspective).

20 Claims, 10 Drawing Sheets

(56) References Cited

U.S. PATENT DOCUMENTS

2017/0099478 A1* 4/2017 Cambridge ........ G02B 27/0093
2017/0269713 A1* 9/2017 Marks .................. G06F 3/0346
2018/0047332 A1* 2/2018 Kuwahara ............ G09G 3/2096

* cited by examiner

HEADSET VISUAL DISPLACEMENT FOR MOTION CORRECTION

BACKGROUND

Within the field of computing, many scenarios involve a headset that presents a visual to a user, where the visual is rendered to translate the motion of the user into a corresponding motion of the visual. For instance, a display mounted within a virtual reality helmet may project a three-dimensional rendering of a scene from a particular perspective, where the motion of the user (e.g., tilting or turning the head; ducking or jumping; or stepping forward, backward, left or right) may cause a scene renderer to render the scene from an altered perspective corresponding to the user's motion.

In such scenarios, many users perceive a lag between the motion and the corresponding rendering of the scene. For example, a headset may be capable of maintaining a generally consistent framerate of 100 Hz, a perceivable delay in the range of ten milliseconds arises between the user's motion and the corresponding translation within the scene—often longer if the scene renderer misses a frame, or is not capable of incorporating a detected motion into the very next frame. The user's perception of this delay may give rise to vertigo and/or motion sickness, which may considerably impair the user's enjoyment of using the headset. The effects may be exacerbated in some cases; e.g., a rapid acceleration, such as quickly turning the head, may amplify the discrepancy between the user's motion and the perceived scene.

BRIEF SUMMARY

The following Brief Summary is provided to introduce a selection of concepts in a simplified form that are further described below in the Detailed Description. This Brief Summary is not intended to identify key factors or essential features of the claimed subject matter, nor is it intended to be used to limit the scope of the claimed subject matter.

It may be appreciated that vertigo and motion sickness reflect a perceived difference between the locations of objects within the user's field of view and the expected locations of such objects following the user's motion. When the user's head turns to the left, the user expects to see the presented objects move to the right, but a static display mounted within the headset causes the objects to remain in static locations, relative the user's eyes, until the visual is updated to reflect a rotated perspective. That is, in a physically static display, the user's head, the headset, display, and visual rotate as a unit, relative to a stationary reference point. The visual therefore moves in correspondence with the user's physical motion until the visual is updated.

In view of this observation, alternative techniques may involve physically displacing the visual within the headset to cause the static scene to shift as the user expects. For instance, when the user's head turns to the left by a certain degree, the display may be displaced to rotate to the right by a corresponding degree, such that even before the scene is updated, the objects appear at accurately translated locations. Similar techniques may be utilized along other axes of motion; e.g., if the user tips the head to the left, the display may be displaced by a corresponding clockwise rotation within the headset. A display with physical displacement, counter to the user's motion, may enable the visual to remain in a static position relative to the stationary reference point, even before the scene is updated. Moreover, because physical devices can detect and respond to motion in a much faster manner than rendering engines can produce updated visuals, the counter-displacement response of the display within the headset may be nearly instantaneous, which may reduce or even eliminate one source of lag that significantly contributes to motion sickness.

Presented herein are techniques usable with display systems of headsets that achieve counter-displacement of the visual relative to the user's motion. In accordance with such techniques, a display within the headset includes a visual displacer that physically displaces the appearance of a visual presented by the display. Such displacement may be achieved, e.g., by actuators that physically relocate the display along various axes; by a prism or mirror that projects the visual onto the display with various degrees of displacement; and/or by a lens that induces various forms of diffraction that cause a visual to appear at a controllably displaced location. Responsive to a motion sensor (e.g., an accelerometer or a visual identification system) detecting a motion of the headset, a visual controller identifies a displacement that, if applied to the display, maintains a physical position of the visual relative to a stationary reference point. The visual controller engages the visual displacer to physically display the visual according to the identified displacement, thereby maintaining the physical position of the visual relative to the stationary reference point.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

While the techniques presented herein may be embodied in alternative forms, the particular embodiments shown in the drawings are only a few such examples that are supplemental of the description provided herein. These embodiments are not to be interpreted as limiting any aspect of the invention, which is defined by the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and systems. Accordingly, this subject matter is not intended to be construed as limited to any example embodiments set forth herein; example embodiments are provided merely to be illustrative. Such embodiments may, for example, take the form of hardware, software, firmware or any combination thereof (other than software per se). A reasonably broad scope for claimed or covered subject matter is intended.

1. Motion-Responsive Headsets

Figure 1:
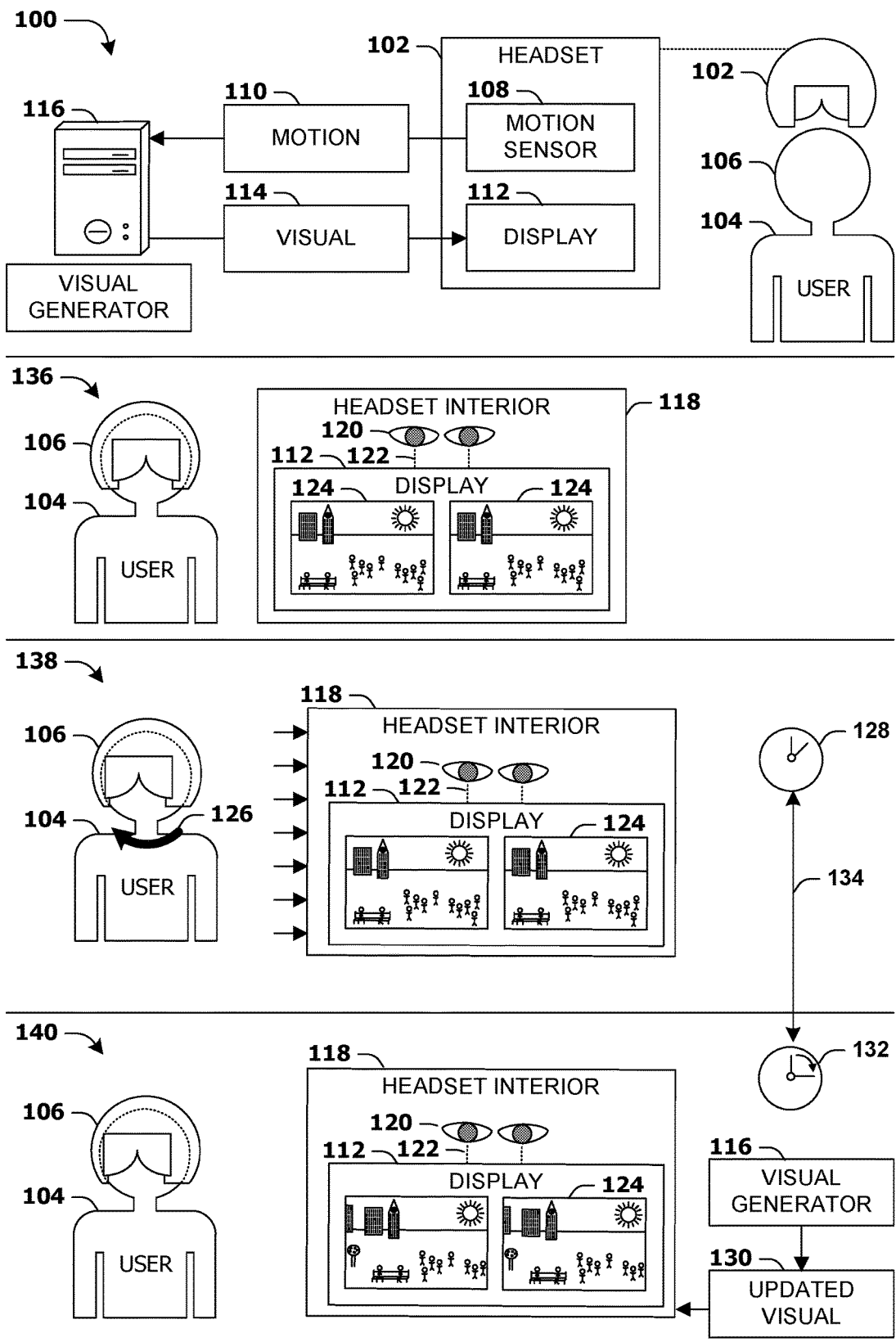
FIG. 1 is an illustration of a scenario involving a presentation of a visual of a headset to a user.

FIG. 1 is an illustration of an example scenario 100 featuring a motion-controlled headset 102 that presents a visual 114 to a user 104. In this scenario, the headset 102 fits on the head 106 of the user 104 and responds to motion 110 by adjusting the contents of the visual 114. For example, a visual generator 116, such as a computer featuring a graphics rendering pipeline, generates a visual 114 comprising a scene viewed from a selected perspective. At a first time 136, the visual 114 is presented on a display 112 within an interior 118 the headset 102, such as a projection onto a lens of a pair of eyeglasses, or a pair of LCDs 124 positioned in front of each eye 120 of the user 104. The same scene may be presented to each eye 120 with a subtly shifted version, such that the rendered objects exhibit a property of depth perception based upon differences in the line of sight 122 between each eye 120 and each LCD 124. In this example scenario 100, the LCDs 124 are fixedly mounted within the interior 118 of the headset 102, such that the motion 110 of the user's head 106 results in the head 106, the headset 102, and the pair of LCDs 124 mounted within the interior 118 moving together as a unit.

As further shown 138 in the example scenario 100, the user may initiate motion 110, such as a rotation 126 of the head 106. The turn 126 may occur at a first time 128, during which the scene displayed on the LCDs 124 remains static. That is, although the user's head 106 has pivoted, the objects depicted within the visual 114 remain at the same physical positions within the user's line of sight 122. As further shown 140 at a second time 132 occurring briefly after the first time 128, the visual generator 116 may generate an updated visual 130 (e.g., a re-rendering of the scene that reflects the rotation 126 of the head 106 by pivoting moving the objects of the scene along the same axis in the opposite direction. The visual 114 therefore incorporates the motion 110 of the user's head 106 in order to simulate the presence of the user 104 within the visual 114, and the translation of the user's motion 110 to the perspective from which the visual 114 is presented.

However, the example scenario 100 of FIG. 1 also demonstrates that a delay arises between the first time 128 when the user 104 initiates a rotation 126 of the head 106, and the second time 132 when the visual 114 is updated to reflect the motion 110. Many factors may influence the duration of this delay, including the responsiveness of the motion sensor 108; the transmission of the signal representing the motion 110 to the visual generator 116; the rendering process of the visual generator 116 to generate the updated visual 130; the transmission of the updated visual 130 from the visual generator 116 to the display 112; and the refresh rate of the display 112. Any of these factors may act as a bottleneck upon the process (e.g., the visual generator 116 may be limited to rendering at a maximum of one frame for each eye 120 at 100 Hz, i.e., one frame every ten milliseconds), thus rendering moot any improvements to the processing rates of the other segments in the rendering pipeline.

Additional factors may exacerbate the delay 134 between the first time 128 when motion 110 occurs and the second time 132 when the updated visual 130 is presented. As a first such example, incomplete synchrony among these elements may extend the delay 134; e.g., even if both the display 112 and the visual generator 116 operate at 100 Hz, a half-cycle timing mismatch between the completion of the updated visual 130 by the visual generator 116 and the refreshing of the display 112 may extend the delay 134 by an additional five milliseconds. Similarly, the user 104 may initiate the motion 110 after the visual generator 116 has begun rendering a first rendering of the visual 114 (such that the motion 110 cannot be incorporated therein), and the motion 110 will be reflected only in the next updated visual 130, causing the delay 134 to extend beyond one entire rendering cycle. As a second such example, the visual generator 116 may be generally capable of rendering visuals 114 at a particular framerate, but computational complexities may lead to skipped frames. For example, the visual 114 may comprise a highly dynamic scene with an extensive number of moving and interacting objects and sophisticated visual effects such as lighting, shading, reflections, and texture and surface mapping, and the visual generator 116 may be incapable of sustaining a consistently high framerate while rendering the complexities of the visual 114.

These sources of delay 134 manifest as a lag between the motion 110 of the user 114 and the user's perception of an updated visual 130 that reflects the motion 110. In many individuals, the visual disconnect between the user's perception of motion 110 and the reflection of motion 110 in an updated visual 130 causes a significant adverse physiological reaction in the form of vertigo or motion sickness, with such symptoms as dizziness, headache, eye strain, and nausea. While some users may be fairly resistant to such reactions, many individuals may be so sensitive to the perception of lag that using the headset 102 becomes unpleasant or unusable.

Given the significance of vertigo and motion sickness, developers are endeavoring to address such problems in headsets 102 by adapting the rendering of the visual 114. As a first example, some headset developers limit the user's rate of motion 110 in order to reduce the magnitude of the perceived lag. That is, the user interface and/or the motion sensor 108 receive and process motion 110 only within a desired velocity, which may encourage the user 104 to move more slowly in a manner that reduces the magnitude of the lag between the motion 110 and the updated visual 130. As a second example, some headset developers are limiting the peripheral viewing region, such that the displayed visual 114 appears to be viewed through a pair of binoculars. As a third example, some headset developers are urging scene renderers (e.g., developers of rendering hardware, rendering engines, and/or visual applications) to reduce the graphical complexity of visual 114, in order to promote a consistently higher framerate. Each of these techniques may reduce the perception of lag, but do so at the expense of the quality of the presented visual. Additionally, optimizations and constraints within the rendering pipeline are unable to address the intrinsic problem that the user's perception of lag is bound by the bottleneck in the rendering pipeline. For example, if displays 112 are only capable of rendering updated visuals 130 at 100 Hz, improvements throughout the rendering pipeline are unable to reduce the lag below ten milliseconds. While estimates vary as to the minimum visual delay that is within the range of human visual perception, many such estimates are below five milliseconds, which is considerably faster than the achievable framerate of many contemporary rendering systems.

2. Presented Techniques

Referring again to the example scenario 100 of FIG. 1, it may be appreciated that the perception of lag is not completely determined by the delay 134 between the motion 110 and the updated visual 130. Rather, the perception of lag is significantly determined by the translation of motion 110 to the altered positions of the content of the visual 114. Upon initiating a rotation 126 of the head 106, the user 104 expects to see the content of the visual 114 rotate in the opposite direction; i.e., if the objects of the visual 114 are stationary, then a clockwise rotation 126 of the perspective naturally produces a visual perception of a counterclockwise rotation of the objects. That is, the positions of stationary content of the visual 114 are expected to remain stationary within the headset interior 118, relative to a stationary reference point, despite the motion 110 of the user 104. Lag arises because when the display 112 is fixedly mounted within the interior 118 of the headset 102, and when the headset 102 moves in synchrony with the motion 110 of the user 104, then the motion 110 of the user 104 does not translate to an opposite movement of the visual 114. Rather, the visual 114 moves as a unit with the motion 110 of the user 104 and therefore remains fixed in place relative to the user's line of sight 112. A disconnect arises between the fixed position of the visual 114 and the user's sensory perception of motion 110 (such as the vestibular system of the inner ear), as well as the user's conscious knowledge of the initiated movement 110. While the disconnect is resolved by generating an updated visual 130 that reflects the altered positions of the content of the visual 114, the delay 132 between the first time 128 when such content appears to have moved with the user 104 (because the display 112 has moved with the user 104), and the second time 132 when the content of the visual 114 is restored to the stationary position to negate the motion 110 of the user 104, significantly contributes to motion sickness and/or vertigo. For the reasons discussed herein, such lag persists due to the difficulty of reducing the round-trip pathway from the motion sensor 108 to the visual generator 116 to the display 112 below the threshold of the user's visual perception.

In accordance with this evaluation, alternative techniques may be devised to establish and maintain the position of the visual 114 within the headset 102 independent of the motion 110 of the user 104. Such techniques involve physically displacing the visual 114 within the headset 102 in a direction that counters the motion 110 of the user 104. For example, a physical repositioning of the display 112 may be performed to maintain the position of the content of the visual 114, relative to a stationary reference point, despite motion 110 of the headset 102 and the user's head 106. In contrast with the complex process of generating an updated visual 130 (which often involves a complete re-processing of the visual 14 through the rendering pipeline of the visual generator 116), the physical displacement of the visual 114 within the headset 102 may be performed using comparatively simple hardware and control systems, which may respond to the motion 110 in a much faster process that is within the threshold of the user's visual perception. That is, the physical displacement of the visual 114 within the interior 118 of the headset 102, counter to the direction and magnitude of the motion 110, may achieve a temporary reduction of the disconnect that provokes motion sickness. The displacement of the visual 114 may be relaxed, and the physical position of the visual 114 within the interior 118 of the headset 102, may be returned to a default physical position as the visual generator 116 produces updated visuals 130 where the motion 110 is rendered according to the position of the visual 114.

Figure 2:
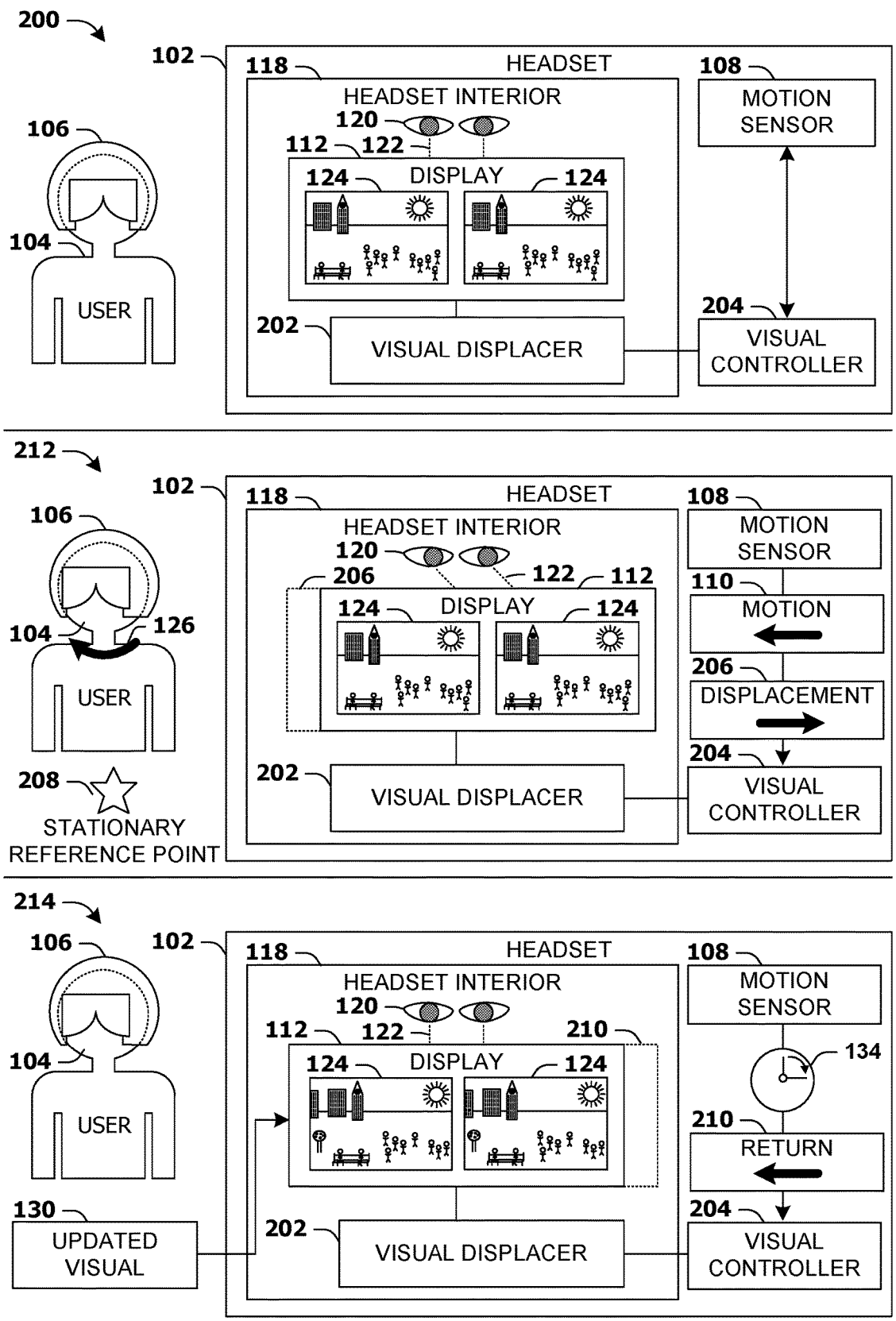
FIG. 2 is an illustration of a scenario involving a presentation of a visual of a headset, in accordance with the techniques presented herein.

FIG. 2 is an illustration of an example scenario 200 featuring a headset 102 that presents a visual 114 to a user 104 with a physical displacement of the visual 114 counter to motion 110 of the user 104 in accordance with the techniques presented herein. In this example scenario 200, the headset 102 features a display 112 within a headset interior 118 that is operatively coupled with a visual displacer 202 that is capable of displacing the physical position of the visual 114 presented by the display 112. As one example, the visual displacer 202 may comprise a set of actuators that, when engaged, move the display 112 in various directions, such as translation and/or rotation along X/Y/Z axes. The visual displacer 202 is controlled by a visual controller 204 based upon a motion sensor 108 that senses a motion 110 of the headset 102.

At a first time 212, the user 104 initiates a rotation 126 of the head 106. The motion 110 is detected by the motion sensor 108, and the visual controller 204 identifies a displacement 206, opposite the motion 126, that causes the visual 114 to maintain a physical position relative to a stationary reference point 208. For example, a five-degree clockwise rotation of the head 106 may be offset by a five-degree counterclockwise rotation of the display 112, relative to a center axis. The visual controller 204 engages the visual displacer 202, and the visual displacer 202 displaces the visual 114 according to the displacement 206 (e.g., rotating the display 112 five degrees within the headset 102) to maintain the physical position of the visual 114 relative to the stationary reference point 208. As a result, even though the head 106 of the user 104 has rotated clockwise, the offsetting counterclockwise rotation of the display 112 causes the content of the visual 114 to move relative to the line of sight 122 of the user 104 within the interior 118 of the headset 102, such that the content of the visual 114 moves relative to the eyes 120 of the user 104 in a manner that is consistent with the motion 110 of the user 104 (and in contrast with the example scenario 100 of FIG. 1, where the display 112 and visual 114 remain stationary relative to the eyes 120 despite the motion 110 of the user 104, thereby creating a disconnect). Such displacement 206 of the visual 114 is also achieved even though the content of the visual 114 has not yet been updated to reflect the motion 110.

As further illustrated in the example scenario 200 of FIG. 2, at a second time point 214 after the first time point 212, a visual generator 116 may provide an updated visual 130, rendered from a perspective where the content reflects the motion 110 of the user 104. The visual controller 204 may identify a displacement return 210 that returns the visual 114 to an initial position within the interior 118 of the headset 102 (e.g., if the visual 114 was initially presented from a center position, the displacement return 210 may be identified as a displacement that repositions the visual 114 to the center position). The visual controller 204 engages the visual displacer 202 to displace the visual 114 according to the displacement return 210, synchronous with the display 112 presenting the updated visual 130. That is, the perspective shift induced by the motion 110 of the head 106 of the user 104 is first achieved by the displacement 206; but following a delay 132 in which the visual generator 116 has completed the rendering of the updated visual 130, the perspective shift may now be integrated with the content of the visual 114, and the displacement return 210 may negate the initial displacement 206 of the visual 114. In this manner, the visual displacer 202 and the visual controller 204 coordinate to achieve a displacement 206 of the visual 114 of the display 112 in order to maintain, temporarily, the physical position of the visual 114 relative to a stationary reference point 208, and therefore reduce the perception of lag and the potential effects of motion sickness and vertigo, in accordance with the techniques presented herein.

3. Technical Effect

The techniques presented herein and illustrated in the scenario 200 of FIG. 2 may provide a variety of technical effects for the presentation of the visual 114 to the user 104.

A first technical effect that may be achieved by the techniques presented herein involves the consistent presentation of the visual 114 in a physical position that is maintained relative to a stationary reference point 208, despite the motion 102 of the user 104. Such maintenance enables a reduction of the perceived delay 134 between the first time 128 when the user initiates motion 110 and the second time 132 when such motion is reflected in the content of the visual 114. The reduction of perceived delay 134 enables a reduction, and possibly an elimination, of vertigo and/or motion sickness induced by an undesirable unity between the motion 110 of the user 104 and the appearance of the visual 114 within the interior 118 of the headset 102.

A second technical effect that may be achievable by the techniques presented herein involves a reduced reliance on other techniques that developers of headsets 102 and visual generators 116 (such as rendering engines) utilize to reduce vertigo and/or motion sickness, such as limiting the achievable rate of motion 110, limiting the range of peripheral vision, and/or reducing the detail and robustness of the visual 114 in order to maintain a very high framerate. Dependency upon these techniques may reduce undesirable side-effects, but at the expense of the aesthetic quality of the visual 114. By contrast, reliance upon the techniques presented herein may enable such developers to utilize rendering processes with more complex calculation and that produce more accurate visuals 114, without incurring the deleterious side-effects of lower framerates.

A third technical effect that may be achievable by the techniques presented herein involves stabilization of the visual 114 from motion 110 that is not intentionally initiated by the user 104. For example, various forces upon the headset 102 may cause it to jolt or vibrate, such as the current connection of the headset 102 to a controlling device via cables that may unexpectedly tug or otherwise constrain the motion of the helmet 102. Users who are standing and moving frequently, such as "room-scale" virtual reality scenarios and/or augmented reality scenarios, may induce vibration from the user's footsteps. A headset 102 that is not securely fastened to the head 106 of the user 104 may wobble as the user 104 moves or walks. These factors may cause the display 112 within the headset 102 to jostle or vibrate, which at least may make the visual 114 appear blurry, and at an extreme may render the visual 114 unviewable and the headset 102 unusable. The use of the techniques presented herein may offset unintended movement 110 of the headset 102 and may stabilize the presentation of the visual 114 to the user 102, thereby improving the aesthetic quality of the presented visual 114 and the usability of the headset 102 to the user 104.

A fourth technical effect that may be achievable by the techniques presented herein involves a potential gain in process efficiency through the allocation of rendering between the headset 102 and the visual generator 116. In the example scenario 100 of FIG. 1, the visual generator 116 is entirely responsible for handling the visual response of the headset 102 to the motion 110 of the user 104; i.e., in addition to rendering the visual 114 due to changes within a represented content, the visual generator 116 is also responsive to re-rendering the visual 114 to match the current perspective of the user 104. By contrast, in the example scenario 200 of FIG. 2, at least some measure of the translation of motion 110 of the user 104 to the visual 114 is handled by the visual displacer 202 and the visual controller 204. In many such instances, the displacement 206 may be sufficient to represent such motion 110 (either temporarily or for an extended period), and visual generator 116 may not have to re-render the visual 110 at all. Rather, the visual generator 116 may conserve processing resources for other tasks, and/or may conserve power by refraining from a computationally expensive re-rendering of the visual 110 solely to translate the movement 110 of the user 104 into a difference in the visual 114. The techniques presented herein may therefore enable a reduction and/or optimization of the overall computational burden of the rendering and presentation of the visual 114 in response to motion 110. Many such technical effects may arise from the presentation of the visual 14 to the user 104 of the headset 102 in accordance with the techniques presented herein.

4. Example Embodiments

A first example embodiment of the techniques presented herein is illustrated in FIG. 2, as a headset 102 comprising a display 112 that presents a visual 114, such as a liquid crystal display device or a light-emitting diode array; a projector that projects a visual 114 onto a surface; and/or a transparent surface, such as a lens of a pair of eyeglasses, that integrates circuitry to display visuals 114 within the lens of the eyeglasses. The headset 102 further comprises a motion sensor 108, which detects a motion 110 of the headset 102. The headset 102 further comprises a visual displacer 202, which, in turn, is operatively coupled with the display 112, and which is capable of displacing the display 112 by a displacement 206, thereby causing the visual 114 to appear at a different physical position. As one example, the visual displacer 202 may comprise a set of actuators that physically move and/or rotate the display 112 to cause the visual 114 to move to a different physical position. The headset 102 further comprises a visual controller 204, which is operably coupled with the visual display 202, and which engages the visual displacer 202 with the displacement 206, opposite the motion 110 of the headset 102 detected by the motion sensor 108, to maintain the physical position of the visual 114 relative to a stationary reference point 208. In this manner, the components of the headset 102 adapt the presentation of the visual 114 in response to the motion 110 of the user 104 in accordance with the techniques presented herein.

Figure 3:
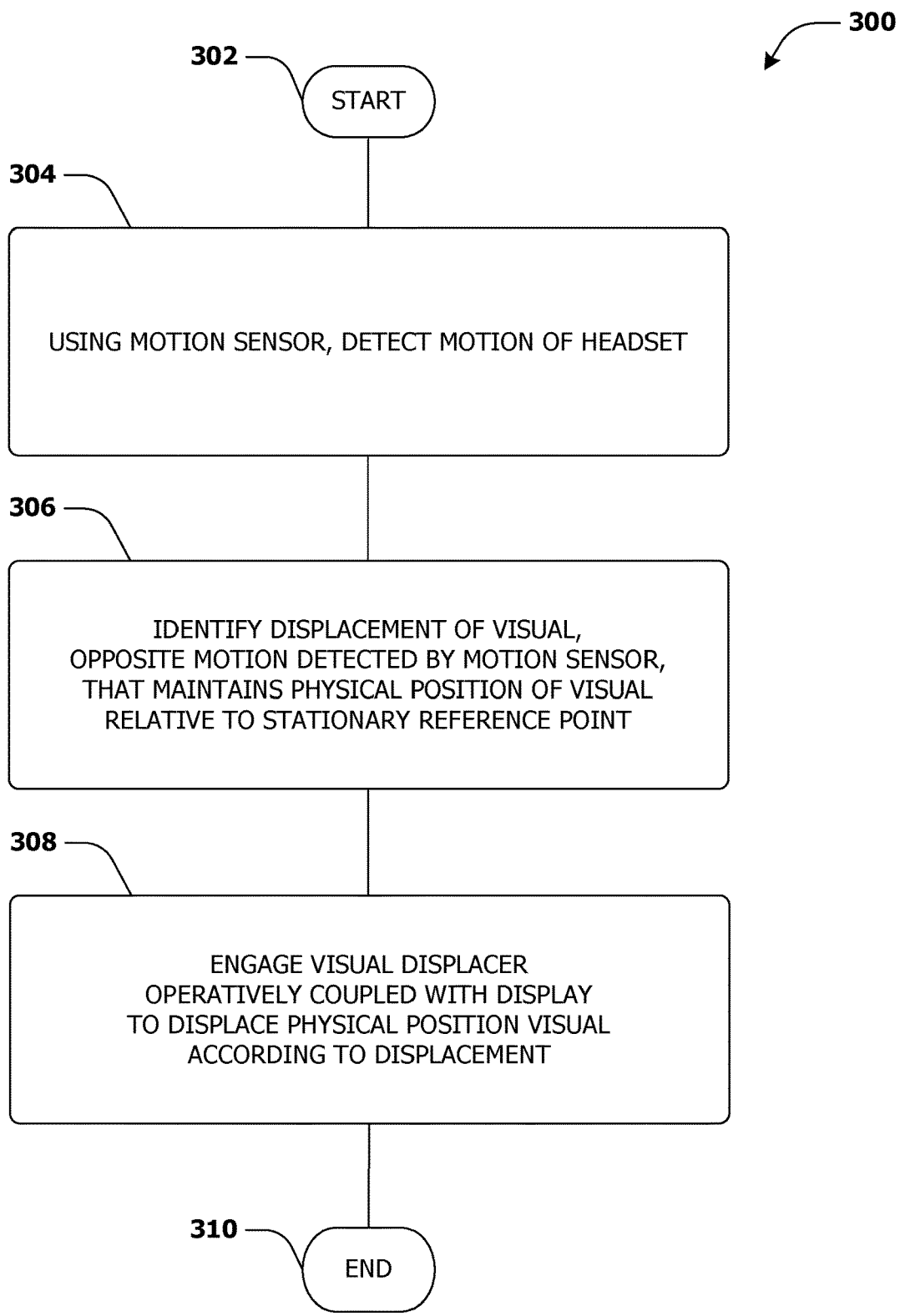
FIG. 3 is an illustration of a first example method of presenting a visual within a headset, in accordance with the techniques presented herein.

FIG. 3 presents an illustration of a second example embodiment of the techniques presented herein, illustrated as a first example method 300 of presenting a visual 114 to a user 104 of a headset 102 comprising a motion sensor 108; a display 112 that presents a visual 114; and a visual displacer 202 operably coupled with the display 112. The example method 300 may be implemented, e.g., as a circuit; as instructions stored in a memory (e.g., a hard disk drive, a solid-state storage device such as a flash memory device, or a magnetic or optical disc) that are executed on a processor within and/or operably coupled with the headset 102; as a physical mechanism; or as a combination of such components, where the implementation operates according to at least a portion of the techniques presented herein.

The example method 300 begins at 302 and comprises, using the motion sensor 108 operably coupled with the headset 102, detecting 304 a motion 110 of the headset 102. The example method 300 also involves identifying 306 a displacement 206 of the visual 114, opposite the motion 110 detected by the motion sensor 108, that maintains the physical position of the visual 114 relative to a stationary reference point 208. The example method also involves engaging 308 the visual displacer 202 that is operably coupled with the display 112 to displace the physical position of the visual according to the displacement 206. In this manner, the example method 300 causes the headset 102 to present the visual 114 in response to the motion 110 in accordance with the techniques presented herein, and so ends at 310.

Figure 4:
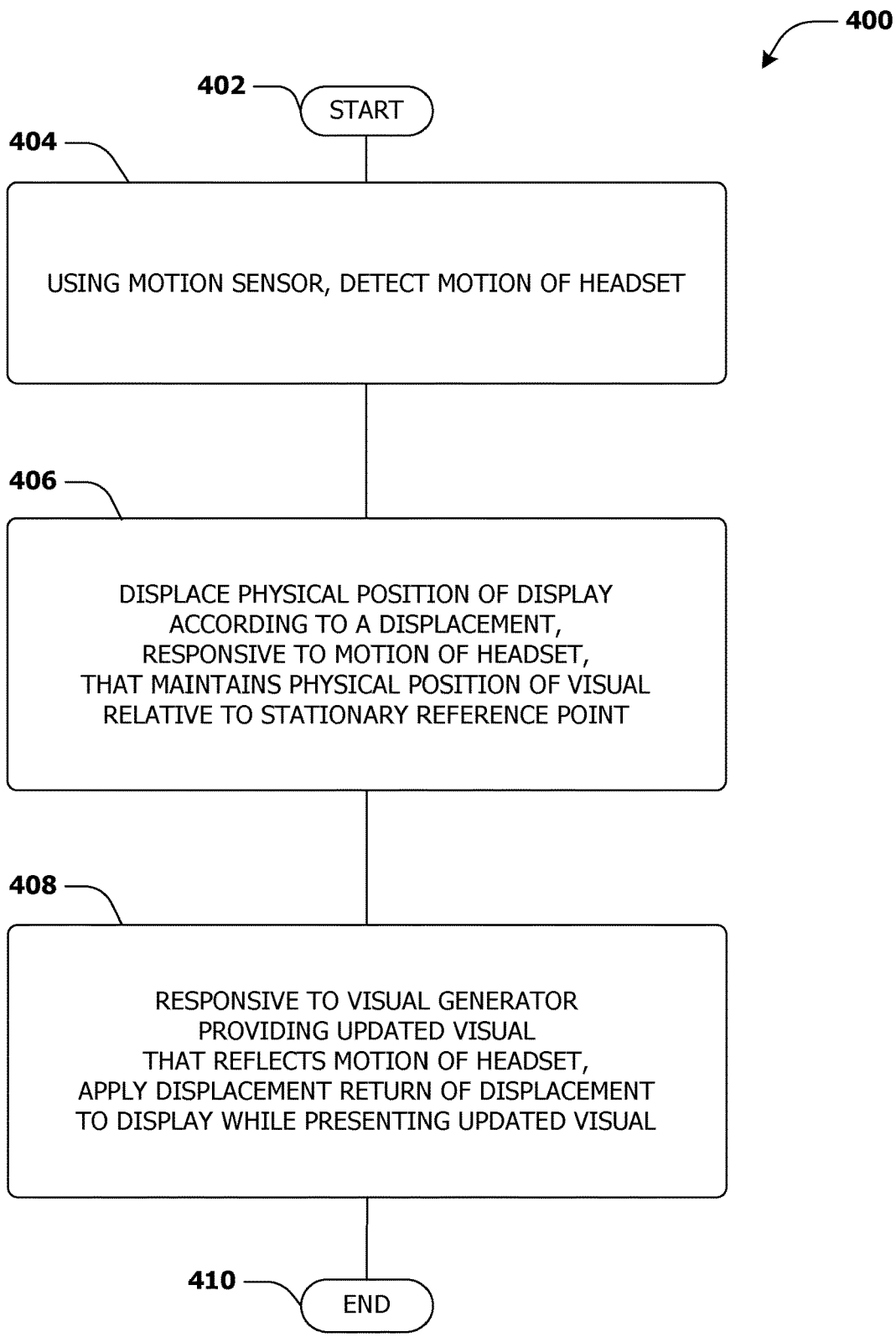
FIG. 4 is an illustration of a second example method of presenting a visual within a headset, in accordance with the techniques presented herein.

FIG. 4 presents an illustration of a third example embodiment of the techniques presented herein, illustrated as a second example method 400 of presenting a visual 114 to a user 104 of a headset 102 comprising a motion sensor 108 and a display 112 that presents a visual 114 generated by a visual generator 116. The example method 400 may be implemented, e.g., as a circuit; as instructions stored in a memory (e.g., a hard disk drive, a solid-state storage device such as a flash memory device, or a magnetic or optical disc) that are executed on a processor within and/or operably coupled with the headset 102; as a physical mechanism; or as a combination of such components, where the implementation operates according to at least a portion of the techniques presented herein.

The example method 400 begins at 402 and comprises, using the motion sensor 108, detecting 404 a motion 110 of the headset 102. The example method 400 further comprises displacing 406 the physical position of the display 112, relative to a displacement 206 that, responsive to the motion 110 of the motion sensor 108, maintains a physical position of the visual 114 presented by the display 112 relative to a stationary reference point 208. The example method 400 further comprises, responsive to the visual generator 116 providing an updated visual 130 that reflects the motion 110 of the headset 102, applying 408 a displacement return 210 of the displacement 206 to the display 112 while presenting the updated visual 130. In this manner, the example method 400 of FIG. 4 causes the headset 102 to present the visual 114 in response to the motion 110 in accordance with the techniques presented herein, and so ends at 410.

Figure 5:
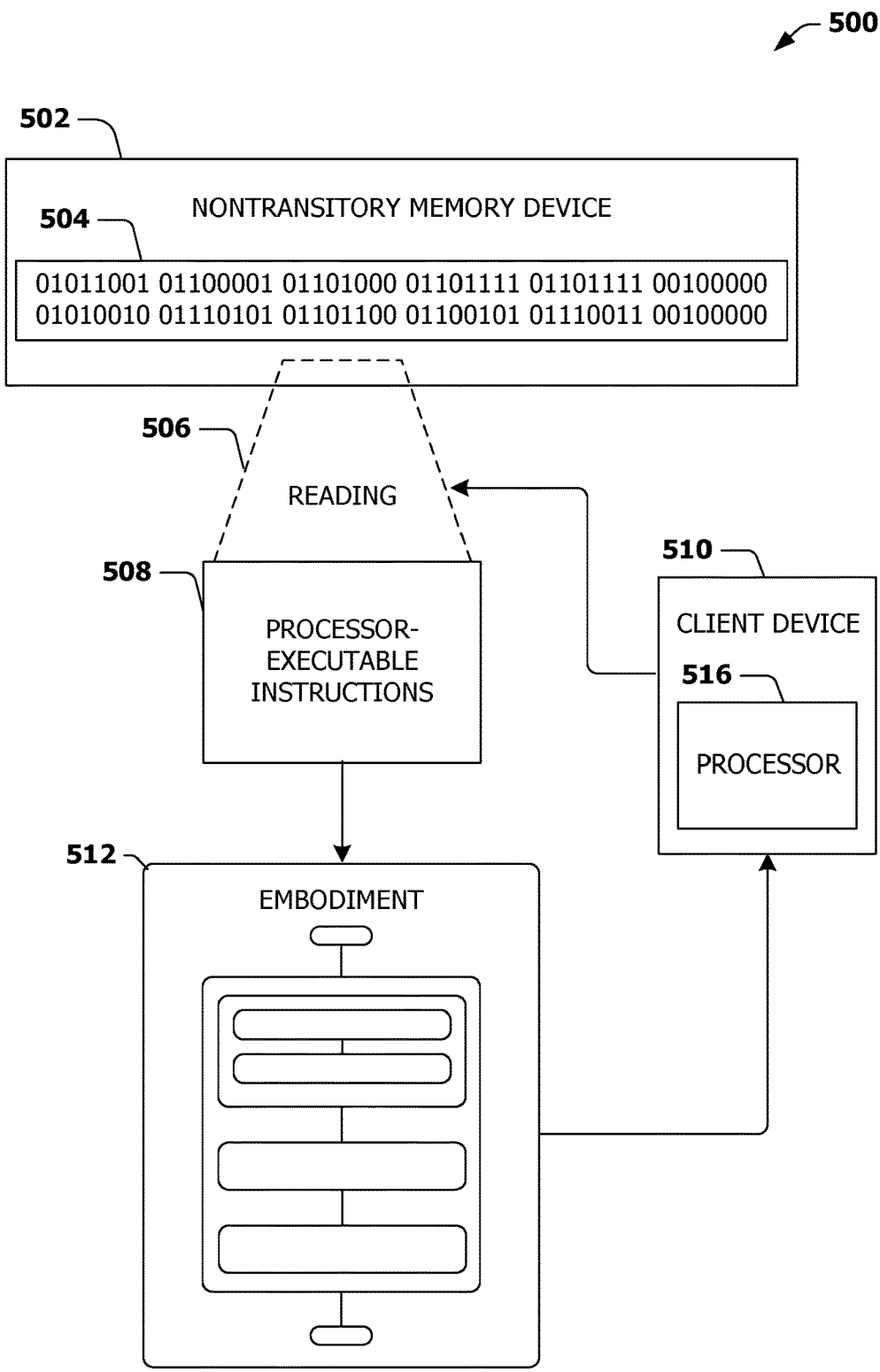
FIG. 5 is an illustration of a scenario featuring an example nontransitory memory device that causes a device to present a visual within a headset, in accordance with the techniques presented herein.

FIG. 5 is an illustration of a scenario 500 involving a sixth example embodiment of the techniques presented herein, comprising an example nontransitory memory device 502, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD, DVD, or floppy disk). The example nontransitory memory device 502 stores computer-readable data 504 that, when subjected to reading 506 by a reader of a client device 510 (e.g., a read head of a hard disk drive, or a read operation invoked on a solid-state storage device), express processor-executable instructions 512. The processor-executable instructions 508, when executed on a processor 516 of a client device 510, cause the client device 510 to implement a method of presenting a visual 114 to a user 104 of a headset 102 in accordance with the techniques presented herein, such as the example method 300 of FIG. 3 or the example method 400 of FIG. 4. In another example, the computer-executable instructions may implement one or more components of a system, such as the example headset 102 in the example scenario 200 of FIG. 2, that causes the headset 102 to present visuals 114 in accordance with the techniques presented herein. Many such embodiments may be devised in which the techniques presented herein may be advantageously utilized.

5. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the example headset 102 of FIG. 2; the first example method 300 of FIG. 3; the second example method 400 of FIG. 4; and/or the example computer-readable memory device 500 of FIG. 5) to confer individual and/or synergistic advantages upon such embodiments.

5.1. Scenarios

A first aspect that may vary among embodiments of the techniques presented herein involves the range of scenarios in which the techniques may be utilized.

As a first variation of this first aspect, the techniques presented herein may be utilized with a variety of headsets 102, such as a helmet worn on the head 106; a pair of eyewear; a contact lens with an integrated display; and/or a projector that projects an image into an eye 120 of the user 104. Additionally, the headset 102 may interface with many types of visual generators 116, such as workstations, laptop and palmtop computers, mobile phones, tablets, game consoles, media players, appliances, wearable devices, and vehicle control systems. Alternatively, the devices noted above may be provided by different sources, such as a first company that designs and provides the headset 102 (e.g., a hardware manufacturer) and a second company that designs and provides a graphics engine that renders visuals 114 for presentation by the headset 102.

As a second variation of this first aspect, the techniques presented herein may be utilized to render many kinds of visuals 114, including virtual-reality presentations of a three-dimensional scene; augmented-reality presentations that integrate the depiction of the visual 114 with a real-world viewing of the environment of the user 104; and/or a heads-up display that presents selected pieces of information to the user without relation to the user's physical processes.

The visuals 114 may also comprise various forms of content, such as geometric objects, user interfaces, text, icons, and media objects.

As a third variation of this first aspect, the techniques presented herein may be utilized to respond to many kinds of motion 110 detected by many types of motion sensors 108. For example, the motion 110 may also be induced by a limited motion of the head 106 of the user 104; by a larger body movement initiated by the user 104, such as bending at the knees or waist; and/or a whole-body movement of the user 104, such as walking. The motion sensor 108 may report the motion 110 as a change in position and/or orientation of the headset 102; as a velocity component of the headset 102; and/or as an acceleration component of the headset 102. Translational and/or rotational motion 110 may also be reported as an absolute value (e.g., a newly identified position of the headset 102 in a coordinate space, or a detected velocity of the headset 102 relative to stationary objects) and/or as a relative value (e.g., a positional offset or a change in velocity). The motion 110 may also be reported using various coordinate systems, such as rectangular coordinates (e.g., motion 110 along individual X/Y/Z axes) and/or radial coordinates (e.g., motion 110 along a particular vector specified by angle and magnitude).

Figure 6:
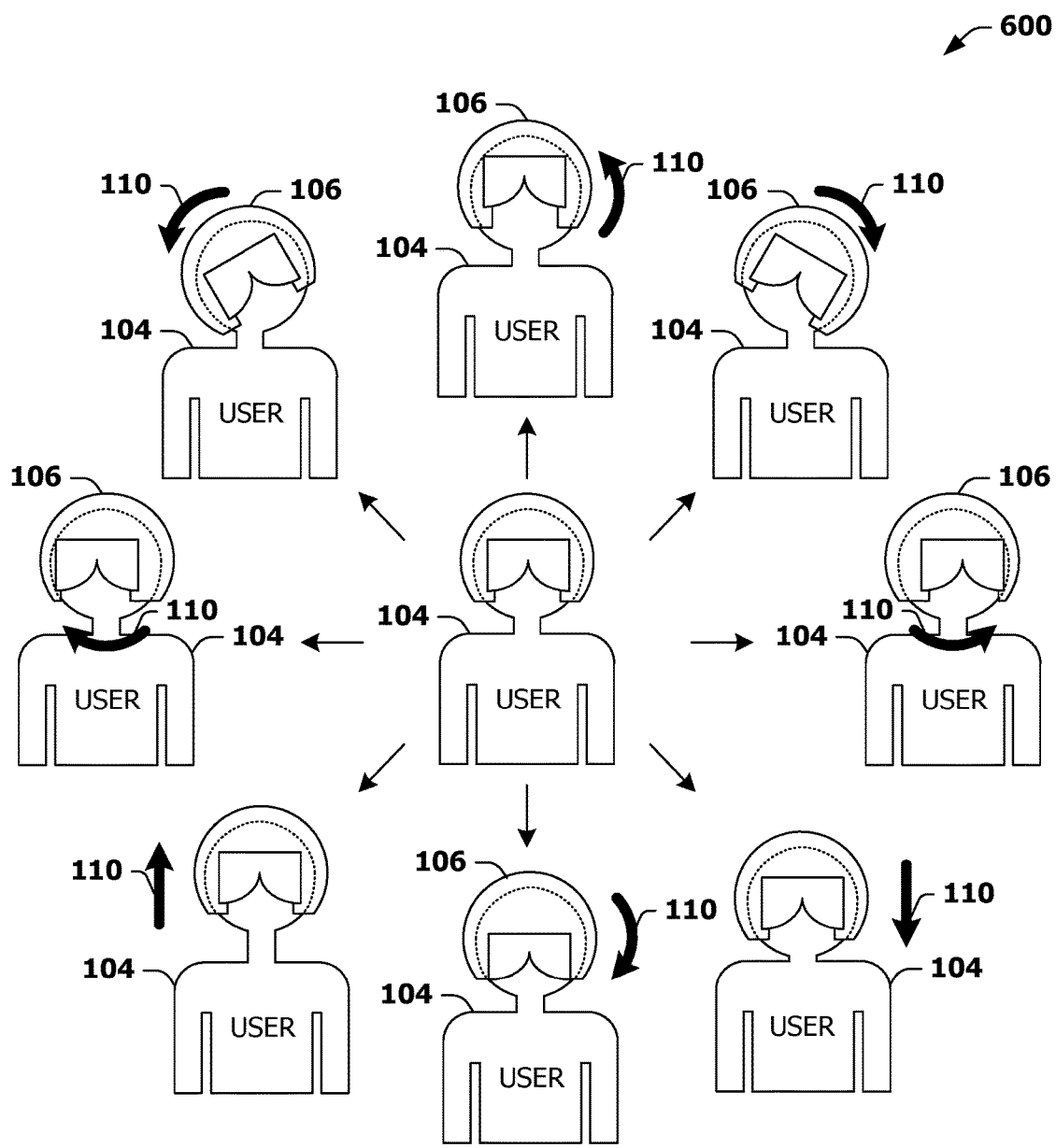
FIG. 6 is an illustration of a set of axes of motion to which a headset may respond by physically displacing a physical position of a visual relative to a stationary reference point, in accordance with the techniques presented herein.

FIG. 6 is an illustration of an example scenario 600 featuring a variety of forms of motion 110 that a user 104 may initiate, and that may be detected by a motion sensor 108 of a headset 102. In this example scenario 600, the user 104 may initiate a movement of the head 106 along a pitch axis (e.g., rotating the head 106 forward and backward, such as nodding the head 106); a yaw axis (e.g., rotating the head 106 left and right); and a roll axis (e.g., tipping the head 106 left and right). The user 104 may also initiate various forms of translational motion, such as stretching up and down, as well as moving laterally forward, backward, left, and right. The headset 102 may detect any such motion of the head 106 or a subset thereof, and may respond accordingly with a displacement 206 of the display 112 to maintain a physical position of a visual 114 with respect to a stationary reference point 208. That is, the motion sensor 108 may detect the motion 110 as a motion type selected from a motion type set comprising a lateral translation; an axial translation; a sagittal translation; a lateral rotation; an axial rotation; and/or a sagittal rotation. Additionally, the visual displacer 202 may displace the physical position of the visual 114 according to the motion type of the motion detected by the motion sensor 108.

Figure 7:
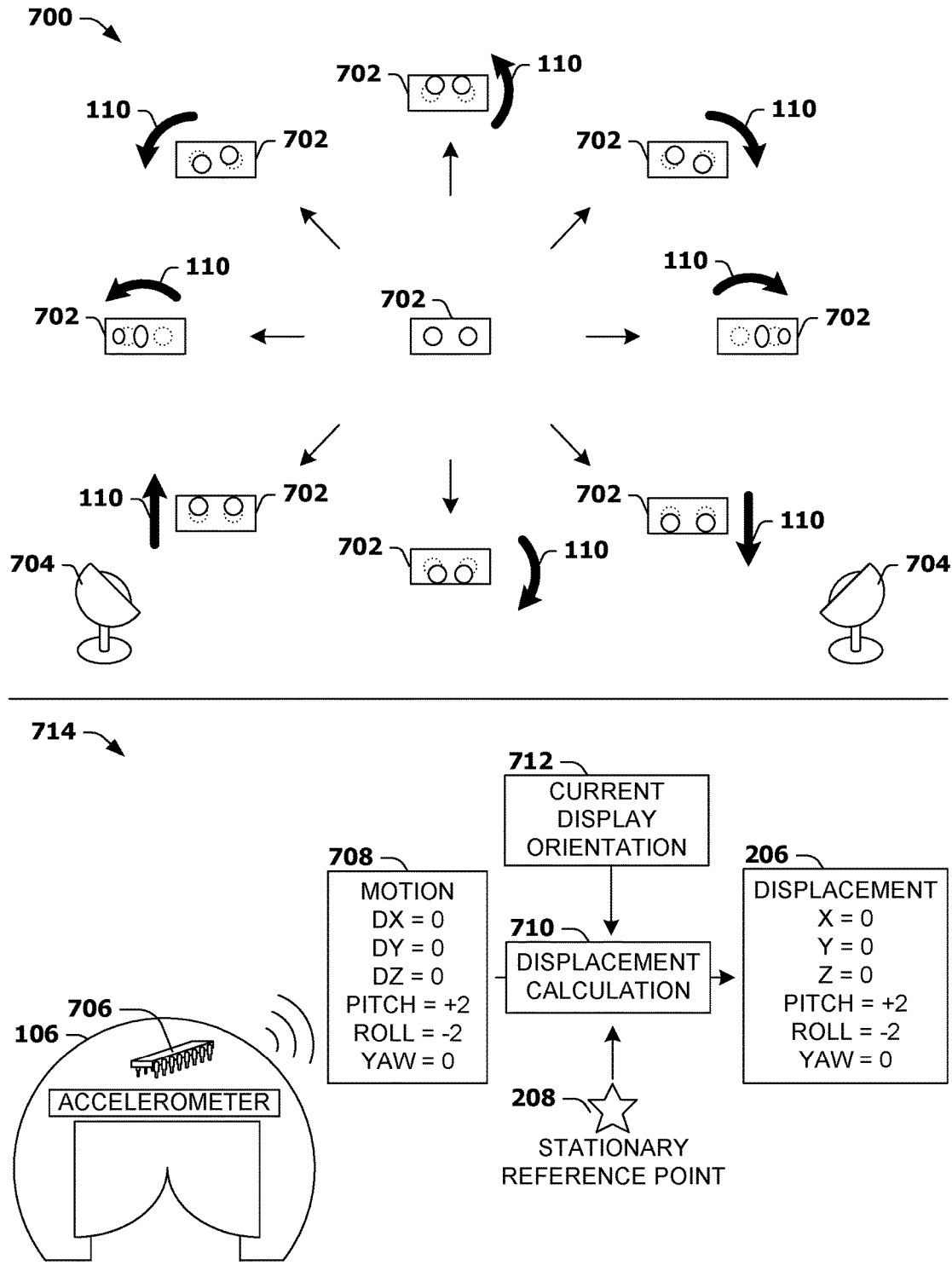
FIG. 7 is an illustration of two examples of motion detectors that detect a motion of a headset, in accordance with the techniques presented herein.

As a fourth variation of this first aspect, a variety of motion sensors 108 may be utilized to detect the motion 110 of the headset 102. FIG. 7 is an illustration of two types of motion sensors 108 that may be used, individually or in combination, to detect the motion 110 of the headset 102. As a first example 700, the headset 102 may comprise a visual coordinator that is coupled with an external detector of the headset 102, where the visual coordinator measures the detected physical position of the headset 102 in order to identify the motion 110 thereof. For example, the headset 110 may include a pair of visual markings 702, which are of a specified shape and size, and of a specified orientation and distance with respect to one another, and are affixed to the helmet 102 at a specified location (e.g., in the back of the helmet 102). The visual markings 7602 may comprise, e.g., spots affixed to the helmet 102 and detectable within and/or outside the visible spectrum range, and/or a pair of lights that may be detected by photoreceptors. One or more cameras 704 may be oriented to observe the movement of the visual markings 702 as indicators of the motion 110 of the helmet 102. For example, a camera 704 may interpret a lateral displacement of the visual markings 702 as an indication of a lateral motion 110 of the helmet 102. Rotation of the visual markings 702 with respect to one another may indicate a pitch, yaw, and/or roll rotation of the helmet 102. Physical distance of the helmet 102 from a camera 704 may be determined based upon the visual size and separation of the visual markings 702 compared with a fixed orientation and distance with respect to one another. More than one camera 704 may be utilized concurrently from different perspectives, e.g., to improve the accuracy and/or precision of the measurements of motion 110, and/or to ensure continued tracking if one camera 704 is obscured. This first example 770 may be advantageous, e.g., because the cameras 704 may be provided at fixed, specific, and possibly identifiable locations, and may detect and report the motion 110 with respect to a static space in which the helmet 102 is used.

FIG. 7 shows a second example 714, wherein motion 110 of the helmet 102 is detected by an accelerometer 706 embedded therein, and which detects velocity and/or acceleration of the headset 102. The accelerometer 706 reports motion 110 as an offset report 708, such as offsets of velocity and/or acceleration along various axes. A displacement calculation 710 may consider the current display orientation 712 and the offset report 708 to determine a displacement 206 of the visual 114 within the helmet 102 that causes the visual 114 to be maintained with respect to a stationary reference point 208.

Other examples of motion sensors 108 that may be operatively coupled with the headset 102 include a gyroscope; a compass; and a headset-mounted camera that performs image evaluation to detect the motion 110 of the headset 102. Many such scenarios may benefit from the displacement 206 of the visual 114 within the helmet 102 in accordance with the techniques presented herein.

5.2. Visual Displacement

A second aspect that may vary among embodiments of the techniques presented herein is the manner of calculating and applying the displacement 206 of the visual 114.

As a first variation of this second aspect, the visual controller 204 may calculate the displacement 206, based upon the motion 110 reported by the motion sensor 108, many ways. As a first such example, the visual controller 204 may comprise an arithmetic unit, such as a processor, may calculate the displacement 206 based upon the motion 110 reported by the motion sensor 108 (e.g., comparing the motion 110 with the stationary reference point 208 and determining a displacement 206 that causes the visual 114 to maintain a physical position with respect to the stationary reference point 208). As a second such example, the visual controller 204 may comprise a lookup table that maps a set of coordinates identifying a motion 110 of the headset 102 to a displacement 206 to be applied to the visual 114. As a third such example, the visual controller 204 may comprise an amplifier, such as a set of transistors, operational amplifiers, and/or programmable logic devices (PLDs), which translate data received from the motion sensor 108 into a corresponding displacement 206.

As a second variation of this second aspect, the determination of the displacement 206 based upon the motion 110 detected by the motion sensor 108 may be calculated in a number of ways. As a first such example, the displacement 206 may simply be a negation of the motion 110 (e.g., if the visual displacer 202 and the motion sensor 108 utilize the same coordinate system, including orientation and scale). Alternatively, the displacement 206 may be translated in various ways from the motion 110 detected and reported by the motion sensor 108. As one such example, the display 112 may be mounted at a specific location within the helmet 102 aligned with the eyes 120 of the user 104, while the motion sensor 108 may be mounted elsewhere in the headset 102, and possibly with a different orientation (e.g., a side of the headset 102). The motion 110 reported by the motion sensor 108 may therefore have to be translated into a different coordinate system to match the motion 110 with the corresponding displacement 206 of the visual 114. For example, the magnitude of the motion 110 may represent a large range of motion of the entire headset 102, but the display 112 may be positioned very close to the eyes 120 of the user 104, such that, from the perspective of the eyes 120 of the user 104, only a small displacement 206 is applied to maintain the physical position of the visual 114 relative to the stationary reference point 208.

Figure 8:
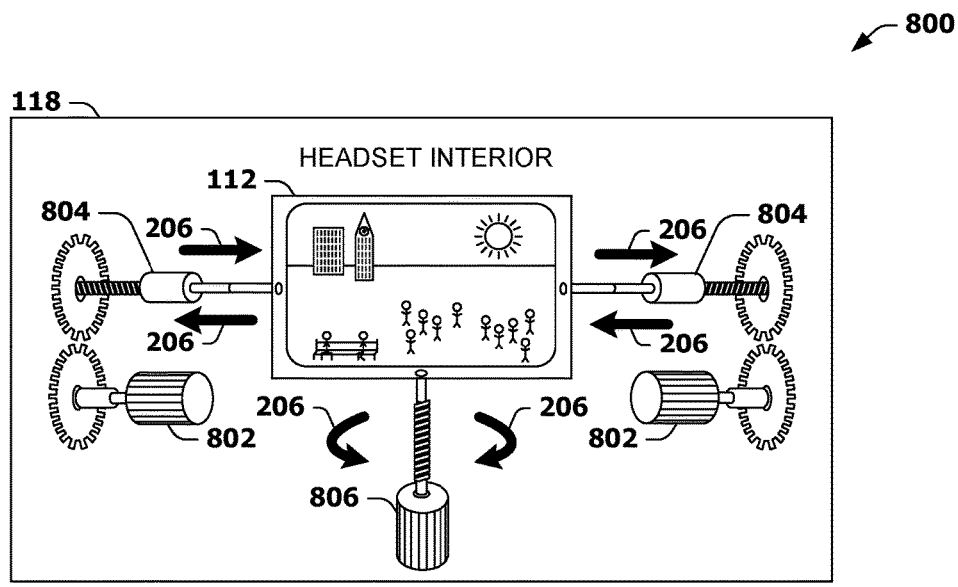
FIG. 8 is an illustration of two examples of visual displacer that displace a visual within a headset to maintain a physical position relative to a stationary reference point, in accordance with the techniques presented herein.
Figure 8:
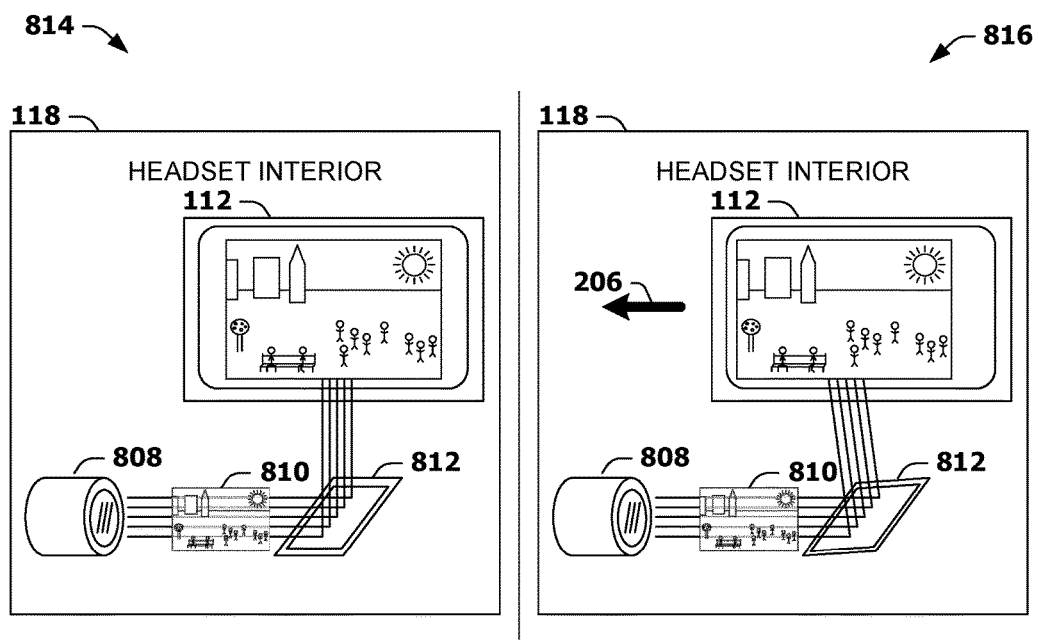

As a third variation of this second aspect, the application of the displacement 206 to the visual 114 may be achieved by many types of visual displacers 202. FIG. 8 presents an illustration of two such examples. As a first example 800, the display 112 may be mounted within a headset interior 118 using a set of actuators. A first set of linear actuators 802 may be connected to a set of lead screw 804 that linearly displace the display 112, such as pushing the display 112 to the left or to the right, in order to move the visual 114 to the left and/or right. A rotary actuator 806 may be applied to rotate the display 112 along an axis, such as a Y-axis rotation responsive to a roll rotation of the head 106 and headset 102. An extensive set of such actuators may achieve various kinds of displacement 206 of the display 112, and hence the visual 114. Multiple actuators may be used together, e.g., in a gimbal system that enables isolated and/or concurrent rotation of the display 112 around multiple axes. Some examples of actuators may include, e.g., a voice coil actuator; a stepper motor (which may also verify the physical position of the display 112 and the displacement 206 thereof); and/or a solenoid.

As a second example depicted in FIG. 8, the display 112 may comprise a surface fixed within the interior 118 of the headset 102, and a projector 808 may project 810 the visual 114 toward the display 112 using a digital micromirror 812. The digital micromirror 812 may further serve as the visual displacer 202 through angular adjustment, causing an offset of the projection 810 upon the surface of the display 112. The offset may enable the visual 114 displayed by the display 112 to maintain a physical position with respect to a stationary reference point 208 despite the movement 110 of the user 104 and the headset 102. At a first time 814 before the motion 110 is detected, the digital micromirror 812 may reflect the projection 810 at a central physical position of the surface of the display 112. However, at a second time 816 following detection of the motion 110, the digital micromirror 812 may rotate along various axes to cause the projection 810 to appear at a displaced physical position on the surface of the display 112, where the angular adjustment produces a displacement 206 of the physical position of the visual 114 upon the display 112, and where the displacement 206 causes the visual 114 to maintain a physical position relative to a stationary reference point 208 despite the movement 110 of the user 104 and the headset 102.

Other alternatives of visual displacers 202 may also be suitable for use in the headset 102 to displace the physical position of the visual 114. As a first such example, the visual displacer 202 may comprise a prism through which the projection 810 is projected. A prism controller may be included that changes a position or orientation of the prism to displace the visual 114 projected upon the display surface according to the displacement 206, e.g., by adjusting the diffraction of the projection 810. As a second such example, a set of lenses may be included, wherein the position and/or orientation of the lenses, relative the stationary reference point 208 and/or to one another, may result in a displacement 206 of the visual 114. For example, piezoelectric sensors may be included that detect motion 110, and electromagnets oriented along the edges of the display 112 may induce a displacement 206 of the display 112 to offset the detected motion 110. Many such devices may be utilized to calculate and/or achieve a displacement 206 of the visual 114 in response to the motion 110 of the headset 102, in accordance with the techniques presented herein.

5.3. Mitigating Noticeability of Visual Displacement

A third aspect that may vary among implementations of the techniques presented herein involves the perception by the user 104 of the displacement 206 of the visual 114. For example, if the displacement 206 of the visual 114 is achieved by moving the display 112, the displacement 206 may be perceived by the user due to the movement of the edges of the display relative to the headset 102. In some cases (particularly if the headset 102 is enclosed, such as a helmet), a significant contrast boundary may exist between the brightly-lit display 112 and the interior 118 of the headset 102, and even as the physical position of the visual 114 remains constant, the relative motion of the edge of the display 112 relative to the eyes 120 of the user 104 and the interior of the headset 118 may be noticeable in the user's peripheral vision, and possibly distracting to the user 104.

This potential deficiency may be addressed through a variety of techniques. As a first such variation, the display 112 may overscan the visual 114, such that a portion of the visual 114 is available for displaying but not fully displayed by the display 112. When a displacement 206 is applied to the display 112 to maintain the physical position of the visual 114, a previously unviewed peripheral portion of the visual 114 comes into view, thus avoiding the perception that the edge of the display 112 is in motion relative to the interior 118 of the headset 102. In conjunction with displacing the physical position of the visual 114, the headset 102 may adjust the presentation of the visual 114 to display the previously unviewed peripheral portion of the visual 114 consistent with the displacement 206 of the visual 114.

Figure 9:
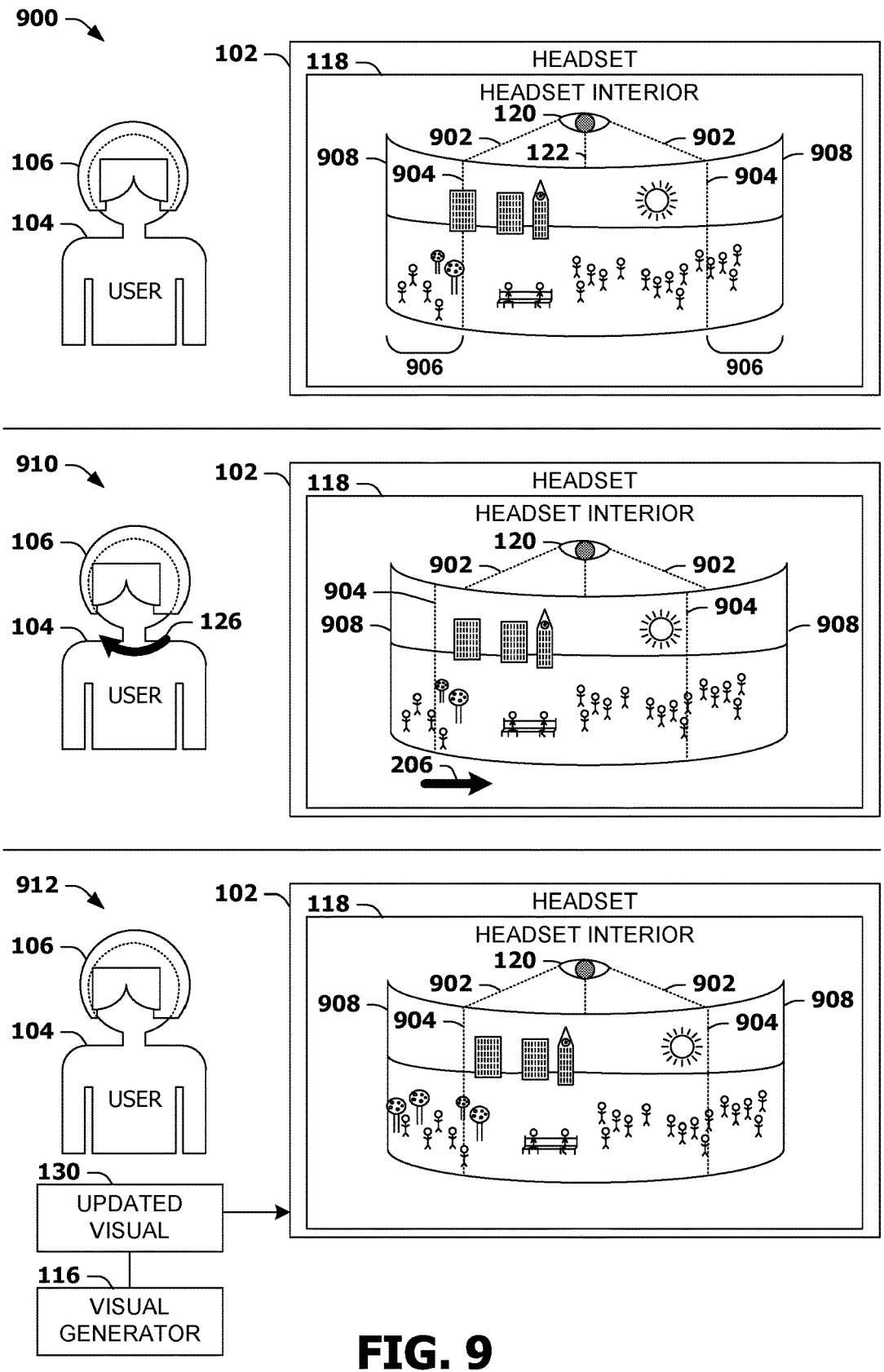
FIG. 9 is an illustration of an example scenario featuring an oversized display within a headset that is physically displaced to maintain a physical position of a visual relative to a stationary reference point, in accordance with the techniques presented herein.

FIG. 9 presents an example of this first variation, wherein the display 114 spans an interior range of the headset 102 beyond the peripheral vision 902 of the eye 120 of the user 104. In this example, at a first time 900, the display 112 is centered with respect the line of sight 122 of the user 104, whose eye 120 include a particular range of peripheral vision 902 that reaches to a particular peripheral vision range 904 of the display 102. The display 102 further extends beyond the peripheral vision range 904 of the display 102, and a extra-peripheral portion 906 of the display 102, between the boundary of the peripheral vision range and the actual edge 908 of the display 112, displays the visual 114 even though the user 104 is unable to view it in his or her peripheral vision 902. At a second time 910, the user 104 initiates a rotation 126 of the head 106 and the headset 102 applies a lateral displacement 206 to the display 112 to maintain the physical position of the visual 114 relative to a stationary reference point 208. Moreover, because the display 112 is laterally oversized to extend beyond the peripheral vision range 904, the displacement 206 causes a span of the extra-peripheral portion 906 that was previously not visible to the user 104 to cross the peripheral vision range 904 and into the peripheral vision 902 of the user 104, and the actual edge 908 of the display 112 remains beyond the peripheral vision range 904 of the user 104. At a third time 912, when an updated visual 130 is provided by the visual generator 116, the display 112 is returned to the neutral or center position, and the extra-peripheral range 906 remains available in case of subsequent displacement 206.

As a second variation of this third aspect, the display 112 may be adapted with a visual gradient that is reduced toward the edges of the display 112. For example, a central portion of the display 112 may present the visual 114 with full brightness and contrast, but lateral portions of the display 112 may present the visual 114 with steadily diminishing brightness and contrast, thus reducing the magnitude of the visual boundary between the actual edge 908 of the display 112 and the interior 118 of the headset 102. As the visual 114 is displaced, even if the edge 908 of the display 112 moves relative to the interior 118 of the headset 102 and within the peripheral vison range 904 of the user 104, the reduced contrast between the edge 908 of the display 112 and the interior 118 of the headset 102 may diminish the visibility of the displacement 206 to the user 104. Many such techniques may be utilized to reduce the noticeability of the displacement 206 to the user 104 in accordance with the techniques presented herein.

5.4. Displacement Return

A fourth aspect that may vary among implementations of the techniques presented herein involve a displacement return 210 of the displacement 206 of the visual 114. With some of the techniques presented herein, the displacement 206 of the visual 114 is only achievable over a limited range (e.g., the actuators and digital micromirror presented in the examples of FIG. 8 have a limited range of movement), and displacement 206 along a particular axis may reach the limit of the range of the displacement 206 and preclude further displacement 206. Moreover, because the displacement 206 is provided to maintain the position of the visual 114 only until the visual generator 116 updates the visual 114 to reflect the motion 110 of the user 104, maintaining the displacement 206 once the updated visual 130 has been provided may cause a deleterious effect of doubling the displacement 206 of the visual 114, thereby causing the visual 114 to move in the direction opposite the stationary reference point 208. For example, a clockwise rotation 2126 of the user's head by three degrees may be offset by displacing the display 112 by three degrees counterclockwise, thereby causing the visual 114 to maintain a physical position relative to the stationary reference point 208. However, the updated visual 130 also reflects a three-degree counterclockwise rotation of the content of the visual 114, such that applying both the updated visual 130 and the displacement 206 of the visual 114 results in the content appearing rotated not only six degrees counterclockwise with respect to the user's line of sight 122, but an anomalous rotation of three degrees counterclockwise with respect to the stationary reference point 208. Accordingly, a displacement return 210 may be applied to reverse the displacement 206 of the visual 114 as the updated visual 130 is presented.

As a first variation of this fourth aspect, the visual displacer 202 may apply the displacement 206 to the visual 114 for a particular duration following the motion 110, and then reverse the displacement 206. For example, after applying a displacement 206 to the visual 114 from an initial position, the visual displacer 202 may wait for a displacement period, and then, after the displacement period, return the visual 114 to the initial position. The displacement return 210 may be applied gradually to reduce its noticeability to the user 102; e.g., following the motion 110, the visual displacer 202 may incrementally choose a displacement 210 that is smaller than a previous displacement 210 of the visual 114, and adjust the displacement 206 the physical position of the visual 114 at incrementally smaller intervals according to the displacement 210.

As a second variation of this fourth aspect, rather than automatically applying a displacement return 210, the visual displacer 202 may monitor the continued activity of the user 104 and the headset 102, and adjust the displacement 206 in accordance therewith. As a first such example, the displacement return 210 may be applied during a stationary period, represented by an absence of motion of the headset. Alternatively, prior to fully returning the display 112 to the initial position, the motion sensor 108 may detect a second motion 110 of the headset 102, and the displacement 206 may be adjusted to incorporate both the initial motion 110 and the second motion 110 (e.g., the user 104 may rotate the head both clockwise and forward, and the visual controller 204 may apply a displacement 206 of the visual 114 that is both counterclockwise and backward). In some cases, the second motion 110 may enable a supplemental displacement 206 resulting in a displacement 206 that returns the visual 114 to a neutral position; e.g., the user 104 may rotate the head clockwise and then back to center, and a first clockwise displacement 206 and a second counterclockwise displacement 26 may together serve as a displacement return 210.

As a third variation of this fourth aspect, the visual controller 204 and the scene generator 116 may intercommunicate to coordinate the displacement 206 of the visual 114 and the presentation of the updated visual 130. Applying the displacement return 210 either before or after presenting the updated visual 130 may result in a temporary but potentially noticeable incorrect positioning of the visual 114 (e.g., either briefly undercorrecting or briefly overcorrecting for the motion 110 of the user 104). Accordingly, the coordination of the visual controller 204 and the visual generator 116 may communicate such that the displacement return 210 is applied concurrently with presenting the updated visual 130, thereby reducing the anomalous positioning of the visual 114.

Such coordination may occur in many ways. For example, the visual generator 116 may notify the visual controller 204 when the updated visual 130 is available and ready for presentation by the display 112, and the visual controller 204 may initiate the displacement return 210 at that moment. Conversely, the visual controller 204 may notify the visual generator 116 of the current displacement 206 and the anticipated displacement return 210, such that the visual generator 116 may render successive frames of updated visuals 130 based upon the displacement 206 applied by the visual controller 204 and the visual displacer 202.

Figure 10:
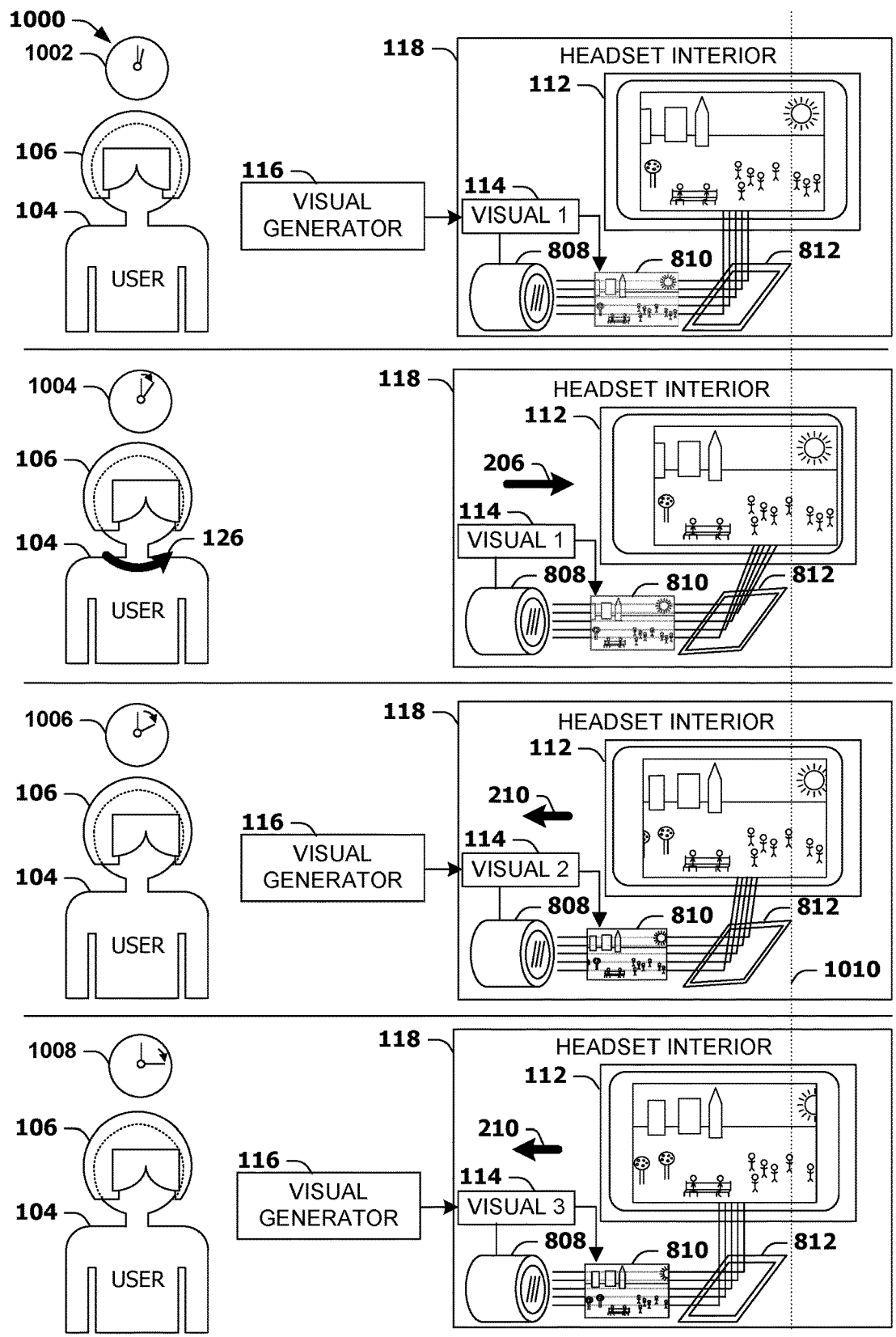
FIG. 10 is an illustration of an example scenario featuring a displacement return of a displacement of a physical position of a visual in cooperation with a visual generator, in accordance with the techniques presented herein.

FIG. 10 presents an illustration of an example scenario 1000 featuring a displacement return 210 of a display 112. In this example scenario 1000, at a first time 1002, a digital micromirror 812, operating as a visual displacer 202, orients the projection 810 of a visual 114 toward a display 112 at a center or neutral position. At a second time 10404, the user 104 initiates a counterclockwise rotation 126 of the head 106, and a visual controller 204 causes the digital micromirror 812 to shift orientation such that the projection 810 exhibits a clockwise displacement 206 with respect to the headset interior 118, which causes the visual 114 to maintain a physical position with respect to a stationary reference point 208. At a third time 1006, while the head 106 of the user 104 is stationary, the visual generator 116 may provide a second visual that incorporates a small degree of lateral shift, reflect some of the motion 110 of the user 104 as an updated perspective of the visual 114, and the visual controller 204 may apply a displacement return 210 by incrementally adjusting the orientation of the digital micromirror 812 to reduce the amount of displacement 206 of the visual 114. At a fourth time 1008, the visual generator 116 may provide a third visual 114 that further incorporates a lateral shift, reflecting an updated perspective that fully incorporates the motion 110 of the user 104, and the visual controller 2094 may further apply a displacement return 210 that further incrementally adjusts the orientation of the digital micromirror 812. As demonstrated by a comparison 1008 of the position of the visual 114, the physical position of the visual 102 is shifted relative to the headset interior 118 between the first time 1002 and the second time 1004 to account for the motion 110 of the user 104 (but the physical position of the visual 102 is maintained relative to a static reference point 208). Moreover, the comparison 1008 demonstrates that the physical position 114 of the visual 114, relative to the eyes 120 of the user 104, maintains the physical position with respect to the static reference point 208, due to the incremental application of the displacement return 210 in conjunction with the presentation of new visuals 114 by the visual generator 116 that incrementally incorporate the motion 110 of the user 104. In this manner, the visual controller 204 and the visual generator 116 interoperate to achieve a gradual, incremental handoff, enabling a gradual relaxation of the displacement 206 that is subtle enough to reduce noticeability by the user 104.

In this manner, the interoperation of the visual generator 116 and the visual controller 204 may be achieved in many ways. As a first such example, the visual controller 204 may periodically report a displacement 206 of the visual 114 to the visual generator 116, either as a current displacement 206 (e.g., the visual displacer 202 is currently displacing the visual 114 by three degrees counterclockwise), or as an anticipated displacement 206 (e.g., if the user 104 does not move again, the displacement 206 that will be applied at the time that the next frame will be presented is three degrees counterclockwise). As a second such example, the visual controller 204 may receive notifications from the visual generator 116 as to the availability of updated visuals 130 and the properties thereof, and the visual controller 204 may cause the visual displacer 202 to apply the displacement return 210 coincident with the notifications from the visual generator 116. For example, a gradient may be defined between an initial perspective before the motion 110 (e.g., a zero-degree rotation of the contents of the visual 114), and an updated perspective that fully reflects the motion 110 (e.g., a three-degree counterclockwise rotation of the perspective of a scene, which may reflect a three-degree clockwise rotation 126 of the head 106 of the user 104). According to this gradient, the visual controller 204 may initially fully apply the displacement 206 before the presented visual 114 has been updated at all to reflect the perspective. At various intervals (e.g., at frame updates by the visual generator 116 and/or refreshes of the display 112), the visual controller 204 may incrementally incorporate the updated perspective, and may notify the visual controller 204 of such incremental application (e.g., a notification that the next frame, which will be available for presentation in 1.3 milliseconds, will incorporate an updated perspective of two degrees counterclockwise, as an incremental adjustment of a three-degree clockwise rotation 126 of the head 106), such that the visual controller 204 may apply a corresponding, incremental displacement return 210 to the visual displacer 202. In this manner, the visual controller 204 and the visual generator 116 may interoperate to translate the motion 110 of the user 104 to an updated perspective of the visual 114. Many such techniques may be utilized to achieve a displacement return 210 of the displacement 110 of the visual 114 in accordance with the techniques presented herein.

6. Usage of Terms

Although the subject matter has been described in language specific to structural features and/or methodological acts, the subject matter defined in the appended claims is not necessarily limited to the specific features or acts described above. Rather, the specific features and acts described above are disclosed as example implementations of the claims.

Although the disclosed subject matter has been shown and described with respect to one or more implementations, equivalent alterations and modifications may occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application.

The claimed subject matter may be implemented in various ways, such as a method, an apparatus, or an article of manufacture. Each such implementation may utilize standard programming and/or engineering techniques to produce software, firmware, hardware, or any combination thereof to control a computer to implement the disclosed subject matter. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

As used herein and unless specified otherwise or clear from context, terms such as "and", "or", or "and/or," may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense.

As used herein and unless specified otherwise or clear from context, the term "or" is intended to mean an inclusive "or" rather than an exclusive "or".

As used herein and unless specified otherwise or clear from context, the terms "a," "an," or "the" may convey either a singular usage or a plural usage.

As used herein and unless specified otherwise or clear from context, the terms "first," "second," etc. are not intended to imply a temporal aspect, a spatial aspect, an ordering, etc. Rather, such terms are merely used as identifiers, names, etc. for features, elements, items, etc. For example, the terms "a first object" and "a second object" generally correspond to object A and object B, or two different objects, or two identical objects, or the same object.

As used herein and unless specified otherwise or clear from context, the terms "includes", "having", "has", "with", and variants thereof are used in either the detailed description or the claims, such terms are intended to be inclusive in a manner similar to the term "comprising."

As used herein and unless specified otherwise or clear from context, the phrase "at least one of," such as "at least one of A and B," generally means A, or B, or both A and B.

As used herein and unless specified otherwise or clear from context, the term "example" is used herein to mean serving as an example, instance, illustration, etc., and not necessarily as advantageous. Any aspect or design described herein as "example" is not necessarily to be construed as advantageous over other aspects or designs. Rather, use of the word example is intended to present concepts in a concrete fashion.

As used herein and unless specified otherwise or clear from context, the term "based on" may be understood as not necessarily intended to convey an exclusive set of factors and may, instead, allow for existence of additional factors not necessarily expressly described, again, depending at least in part on context.

As used herein and unless specified otherwise or clear from context, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

As used herein and unless specified otherwise or clear from context, the term "article of manufacture" as used herein is intended to encompass a computer program accessible from any computer-readable device, carrier, or media.

The invention claimed is:

1. A headset comprising:
   a display that presents a visual;
   a motion sensor that detects a motion of the headset;
   a visual displacer that:
      identifies a displacement of the display, opposite the motion, that maintains a physical position of the visual relative to a stationary reference point; and
      displaces the physical position of the visual according to the displacement;
   a visual generator that incrementally adjusts a perspective of the visual, from an initial perspective to an updated perspective, based upon the motion of the headset; and
   a visual generator interface that periodically reports the displacement of the visual to the visual generator.

2. The headset of claim 1, wherein the motion sensor further comprises at least one of:
   an accelerometer;
   a gyroscope;
   a compass;
   a headset-mounted camera; and
   a visual coordinator coupled with an external detector of the headset.

3. The headset of claim 1, wherein:
   the motion sensor detects the motion of a motion type selected from a motion type set comprising:
      a lateral translation;
      an axial translation;
      a sagittal translation;
      a lateral rotation;
      an axial rotation; and
      a sagittal rotation; and
   the visual displacer physically displaces the display according to the motion type of the motion detected by the motion sensor.

4. The headset of claim 1, wherein the visual displacer further comprises an actuator operatively coupled with the display that physically displaces the display according to the displacement.

5. The headset of claim 4, wherein the actuator further comprises a voice coil actuator.

6. The headset of claim 4, wherein the actuator further comprises a stepper motor that verifies the physical position of the display.

7. The headset of claim 1, wherein:
   the display further comprises a projector that emits a projection of the visual; and
   the visual displacer further comprises a digital micromirror that reflects the projection of the visual toward a display surface, and that rotates to displace the projection upon the display surface according to the displacement.

8. The headset of claim 1, wherein:
   the display further projects the visual upon a display surface through a prism; and
   the visual displacer further comprises a prism controller that changes a position or orientation of the prism to displace the visual projected upon the display surface according to the displacement.

9. The headset of claim 1, wherein the display further spans an interior range of the headset beyond a peripheral vision range of a user of the headset.

10. The headset of claim 1, wherein:
    the display further overscans the visual and initially presents a portion of the visual beyond a boundary of the display; and
    displacing the physical position of the visual further comprises: in conjunction with displacing the physical position of the visual, adjusting the presentation of the visual to display the portion of the visual consistent with the displacement of the visual.

11. The headset of claim 1, wherein the visual displacer physically displaces the display by:
    physically displacing the display, from an initial position, for a displacement period; and
    after the displacement period, returning the display to the initial position.

12. The headset of claim 11, wherein returning the display to the initial position further comprises:
incrementally choosing a second displacement that is smaller than a previous displacement of the visual; and
displacing the physical position of the visual at incrementally smaller intervals according to the second displacement.

13. The headset of claim 11, wherein:
prior to fully returning the display to the initial position, a second motion of the headset is detected; and
identifying the displacement comprises: identifying a second displacement of the display, opposite the motion, that also incorporates the second motion of the headset.

14. The headset of claim 11, wherein returning the display further comprises: detecting a displacement position during a stationary period represented by an absence of motion of the headset.

15. The headset of claim 11, wherein:
the motion sensor detects the motion based upon at least one of:
a lateral translation;
an axial translation;
a sagittal translation;
a lateral rotation;
an axial rotation; or
a sagittal rotation.

16. The headset of claim 11, wherein:
the display receives the visual from the visual generator that, after receiving the motion detected by the motion sensor, adjusts the perspective of the visual according to the motion; and
the visual displacer returns the display to the initial position coincident with the visual generator adjusting the perspective of the visual.

17. The headset of claim 16, wherein:
the visual displacer further incrementally returns the display to the initial position, coincident with the visual generator incrementally adjusting the perspective of the visual from the initial perspective to the updated perspective.

18. The headset of claim 16, wherein:
the visual generator generates the visual at a visual framerate; and
returning the display to the initial position coincident with the visual generator further comprises: incrementally adjusting the physical position of the visual according to the visual framerate.

19. A method of presenting a visual on a display of a headset, the method comprising:
using a motion sensor, detecting a motion of the headset;
identifying a displacement of the display, opposite the motion detected by the motion sensor, that maintains a physical position of the visual relative to a stationary reference point;
engaging a visual displacer operatively coupled with the display to displace the physical position of the visual from an initial position according to the displacement;
adjusting a perspective of the visual, from an initial perspective to an updated perspective, based upon the motion of the headset; and
returning the display to the initial position coincident with the adjusting the perspective of the visual.

20. A visual control system operatively coupled with a visual displacer that adjusts a physical position of a visual presented by a display within a headset, the visual control system comprising:
a motion sensor that detects a motion of the headset;
a visual controller that:
identifies a displacement of the visual, opposite the motion, to maintain the physical position of the visual relative to a stationary reference point; and
engages the visual displacer to displace the physical position of the visual from an initial position according to the displacement; and
a visual generator that adjusts a perspective of the visual, from an initial perspective to an updated perspective, based upon the motion of the headset,
wherein the visual displacer returns the display to the initial position in association with the adjusting the perspective of the visual.

* * * * *